United States Patent [19]
Rylicki

[11] 3,821,632
[45] June 28, 1974

[54] HIGH FREQUENCY POWER GENERATOR
[75] Inventor: Edward J. Rylicki, Harwood Heights, Ill.
[73] Assignee: Induction Heating and Engineering Corporation, Chicago, Ill.
[22] Filed: Nov. 6, 1972
[21] Appl. No.: 303,845

Related U.S. Application Data
[63] Continuation-in-part of Ser. No. 197,191, Nov. 9, 1971, abandoned.

[52] U.S. Cl. .............................. 321/45 R, 321/18
[51] Int. Cl. .............................................. H02m 7/52
[58] Field of Search ............................ 321/18, 45

[56] References Cited
UNITED STATES PATENTS

| 3,015,739 | 1/1962 | Manteuffel | 321/45 R |
| 3,316,476 | 4/1967 | Olson et al. | 321/45 R |
| 3,351,779 | 11/1967 | Hehenkamp | 321/45 R |
| 3,387,201 | 6/1968 | Greenberg et al. | 321/45 X |
| 3,406,330 | 10/1968 | Pelly | 321/45 X |
| 3,439,254 | 4/1969 | Forster et al. | 321/45 R |
| 3,543,130 | 11/1970 | Reijnders | 321/18 X |
| 3,573,597 | 4/1971 | Genuit | 321/45 R |
| 3,579,077 | 5/1971 | Cameron | 321/45 R |
| 3,601,680 | 8/1971 | Beckwith | 321/45 X |
| 3,603,866 | 9/1971 | Opal | 321/45 R |

Primary Examiner—William M. Shoop, Jr.
Attorney, Agent, or Firm—Wolfe, Hubbard, Leydig, Voit & Osann, Ltd.

[57] ABSTRACT

A static inverter system capable of providing ac. power at frequencies as high as 10 KHz. is characterized by an exceptionally high power factor and efficiency and employs one or more capacitive storage circuits on a time sequenced basis to cyclically and successively charge from a dc. power supply and discharge through an ac. load. The storage circuit charge via respective thyristors and the sequencing is affected by sequentially gating the thyristors with fast rise time, short duration firing pulses so that very short charging time constants may be selected without danger of damaging the thyristors or upsetting the desired sequencing.

12 Claims, 10 Drawing Figures

HIGH FREQUENCY POWER GENERATOR

This application is a continuation-in-part of my pending application Ser. No. 197,191, filed Nov. 9, 1971 now abandoned.

This invention relates generally to power generators, and more particularly to improved solid state inverter systems for supplying ac. power at frequencies up to at least 10 KHz.

Induction heating and various other industrial processes require substantial ac. power at frequencies far above the 60 Hz. frequency which is characteristic of commercially available power. Thus, provision must often be made to supply higher frequency ac. power, but it is still generally desirable that such provision permit the use of the readily available three phase, 460 volt, 60 Hz. power carried by commercial power mains as the primary source of energy. Indeed, the conventional practice has been to convert the three phase, 60 Hz. energy to single phase energy at some higher frequency. Originally, motor-generator sets were used extensively for this purpose. More recently, however, various electronic inverter systems have been used, including some in which the conversion has been carried out under the control of thyristors, such as silicon controlled rectifiers (SCRs).

The prior art thyristor controlled inverters have generally included a saturable reactor in series with the power circuit of each thyristor to limit the rate of change of the current ($di/dt$) through the thyristor under the transient conditions existing as the thyristor is switched from its non-conductive state to its conductive state. The saturable reactors necessarily cause some degradation in the performance of the inverter because they cause the inverter to have a relatively poor power factor and a relatively slow or sluggish output response, together with a relatively poor efficiency due to the high reactor losses. These disadvantages are not particularly noticeable so long as the output frequency of the inverter does not exceed the maximum switching rate for the thyristors, which at the present state of the art is about 4 KHz. The poor power factor and the high reactor losses simply require that the inverter draw more input power which, from a practical standpoint, may be considered to be virtually unlimited. If, however, as has been suggested, the inverter includes frequency multiplying means to enable it to be used in those instances (for example, in the induction heating art) where the optimum output frequency is substantially higher than the maximum permissible switching rate for the thyristors, the presence of the saturable reactors not only reduces the efficiency of the inverter, but also causes serious distortion of the output waveform which, in turn, may cause substantial electrical and electromagnetic noise and interference. Nevertheless, the practice has been to retain the saturable reactors to protect the thyristors.

Certain of the lesser, although real, disadvantages of the prior thyristor controlled inverters are also noteworthy in the interest of putting my invention in proper perspective. For example, some require auxiliary booster or pump circuits which function only during the initial few cycles of operation to assist in starting the power inverting action. Similarly, such inverters are sometimes rather inflexible by virtue of having a lower limit for the power level which may be selected as the set point. Also, prior art thyristor controlled inverters are often sensitive to the output power factor, generally with the result that the output load must be selected to provide a leading power factor.

The primary aim of the present invention is to provide an improved thyristor controlled inverter. More particularly, it is an object of the present invention to provide a relatively efficient thyristor controlled inverter which is capable of supplying ac. power at frequencies up to at least 10 KHz. with little, if any, distortion of the desired sinusoidal output waveform. Even more specifically, it is an object of this invention to provide a variable frequency inverter system capable of operating with an efficiency in the range of 90–95 percent.

Another related object is to provide a gate control circuit for the thyristors of such an inverter to supply them with fast rise time, high amplitude, short duration firing pulses. I have found that the performance of an inverter of the foregoing type may be vastly improved if the thyristors are gated with such firing pulses. Specifically, the transient response characteristics of the thyristors are improved since they are capable of handling higher rates of change of current and thus they do not require saturable reactors for rate limiting purposes. Instead, the relatively minor rate limiting required may be provided by linear reactors so as to improve the inverter efficiency and response time.

Another object is to provide a thyristor controlled inverter of the foregoing type which permits a relatively simple but highly reliable control. More particularly, an object of this invention is to provide an inverter which has a relatively fast settling time so that the output power stabilizes at the desired set point shortly after input power is applied. Still another object is to provide an inverter in which provision is made to respond to and rapidly eliminate any deviation of the output power from its set point and to permit adjustment of the output power and voltage set points over broad ranges.

Another object is to provide a power generator of the foregoing type having an improved output response.

A further object is to provide a thyristor controlled inverter which is capable of operating with an output power factor of 0.75 or better so that the internal power losses may be reduced.

Finally, it is a general object of the present invention to provide a high frequency thyristor controlled inverter which is relatively quiet, easy to operate, and more compact than heretofore known.

Other objects and advantages of the invention will be apparent from the following detailed description taken in conjunction with the accompanying drawings, in which.

Figure 1:
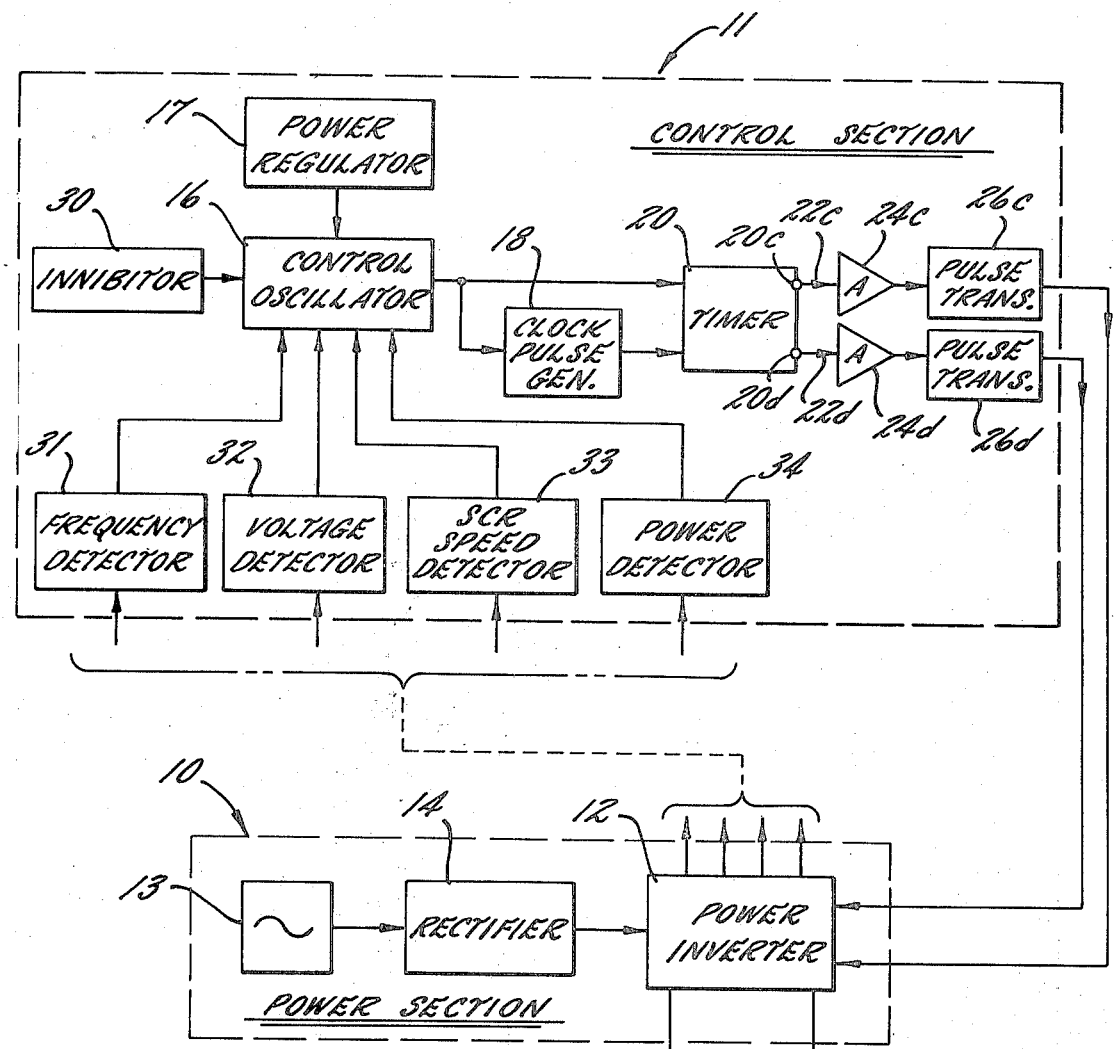
FIG. 1 is a simplified block diagram showing both the power and control sections of a power generator embodying the present invention.
Figure 2:
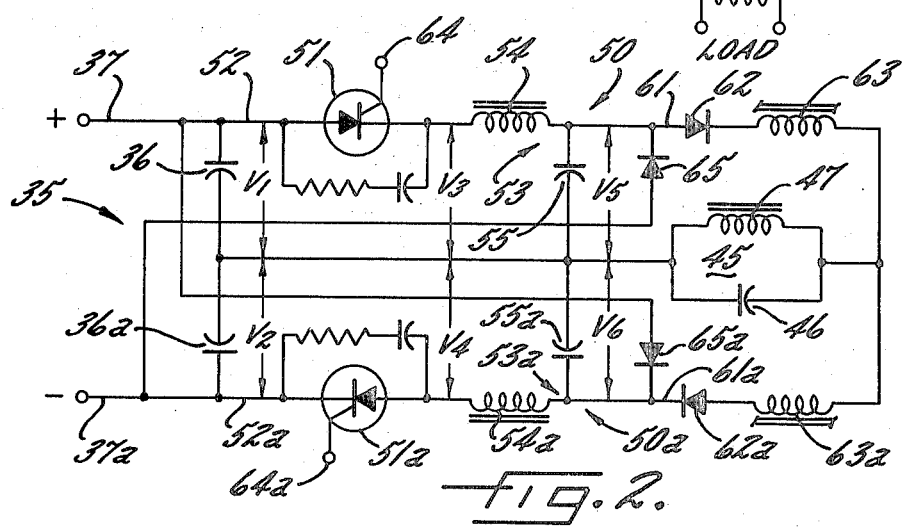
FIG. 2 is an electrical schematic of one embodiment of the power inverter circuit shown in FIG. 1
Figure 5A:
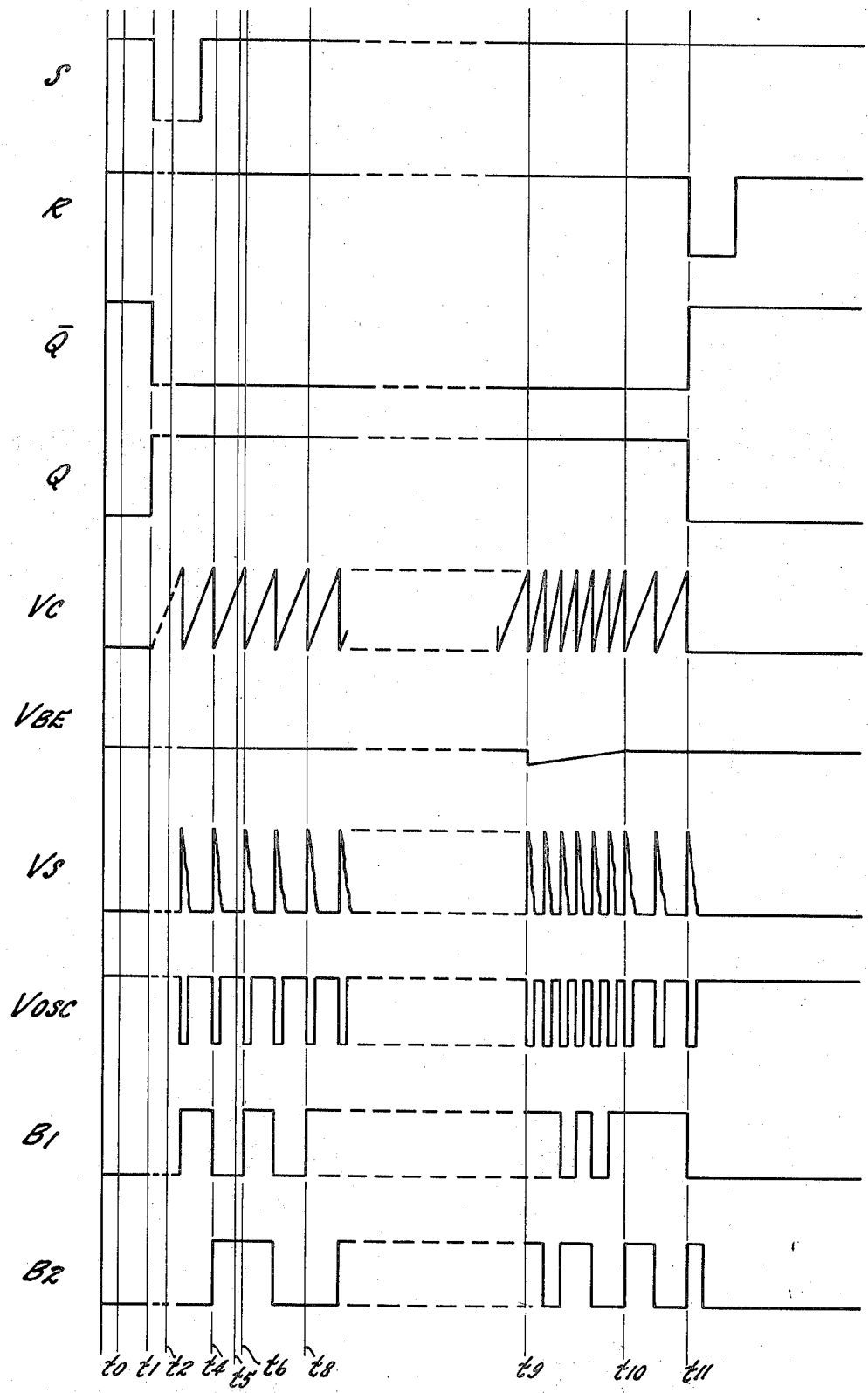
Figure 5B:
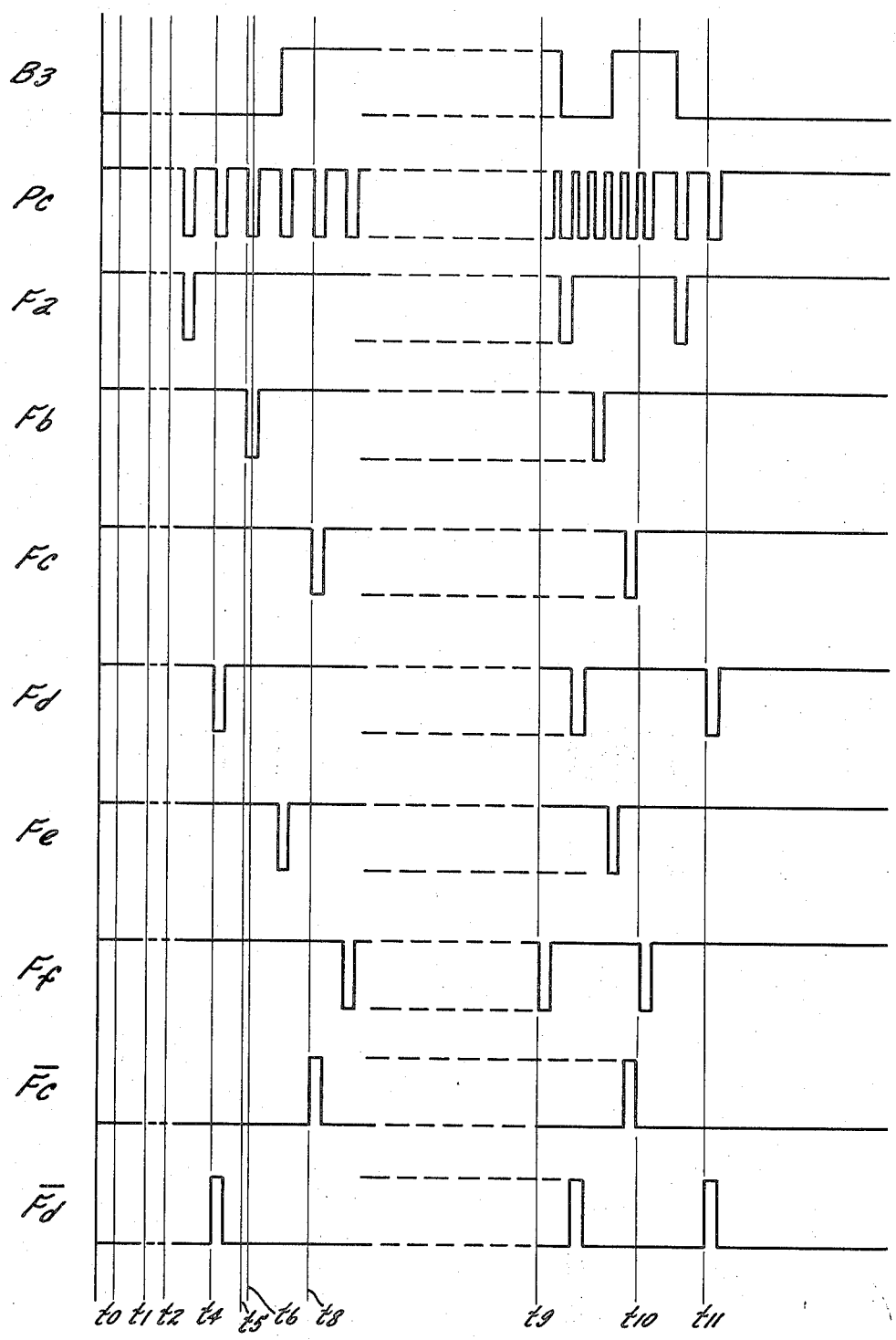
Figure 5C:
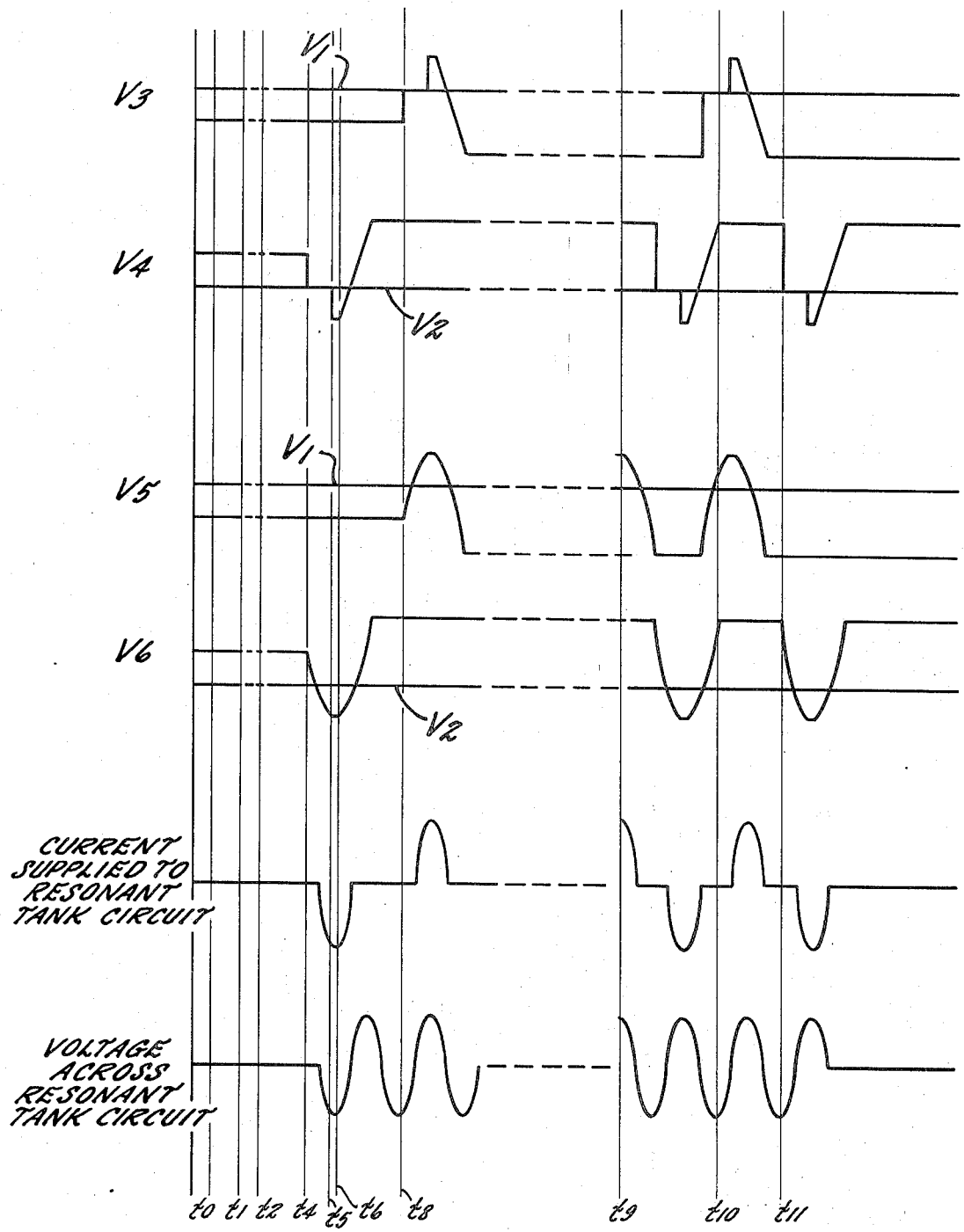
Figure 6:
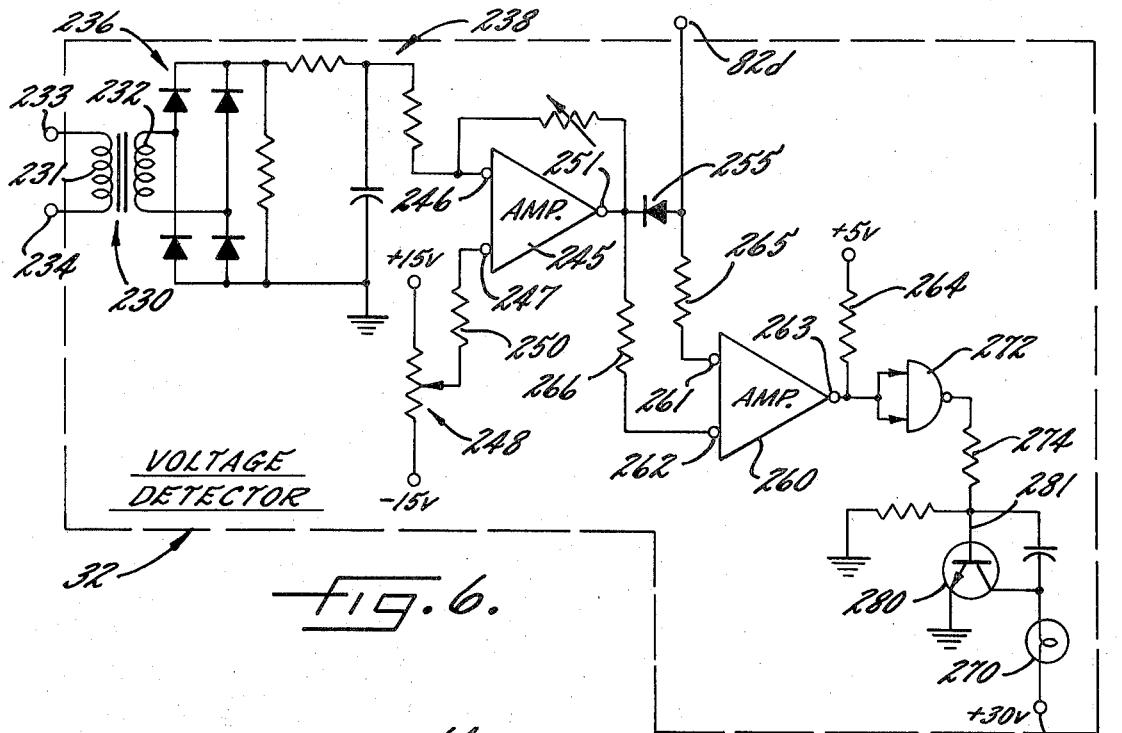
Figure 7:
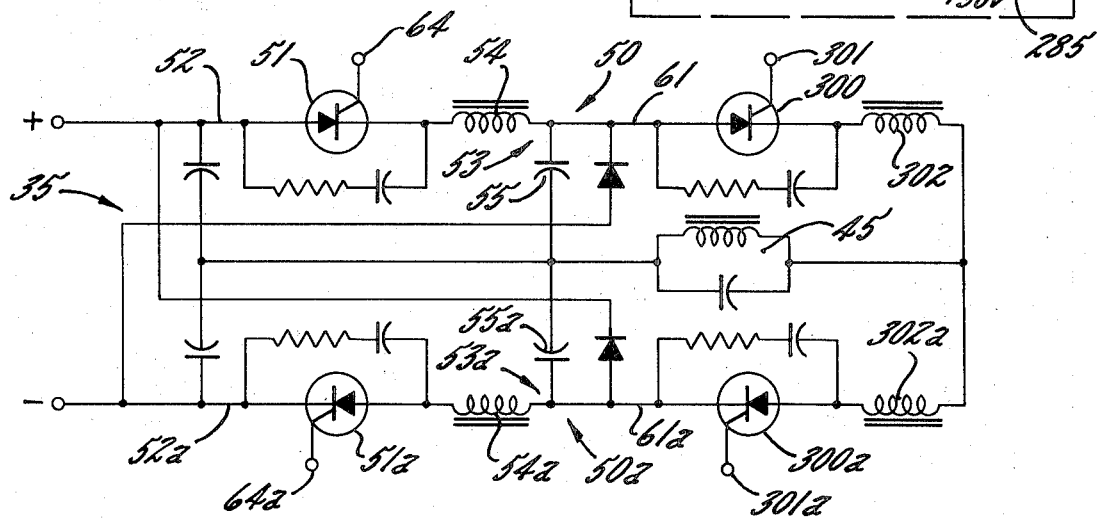
Figure 8:
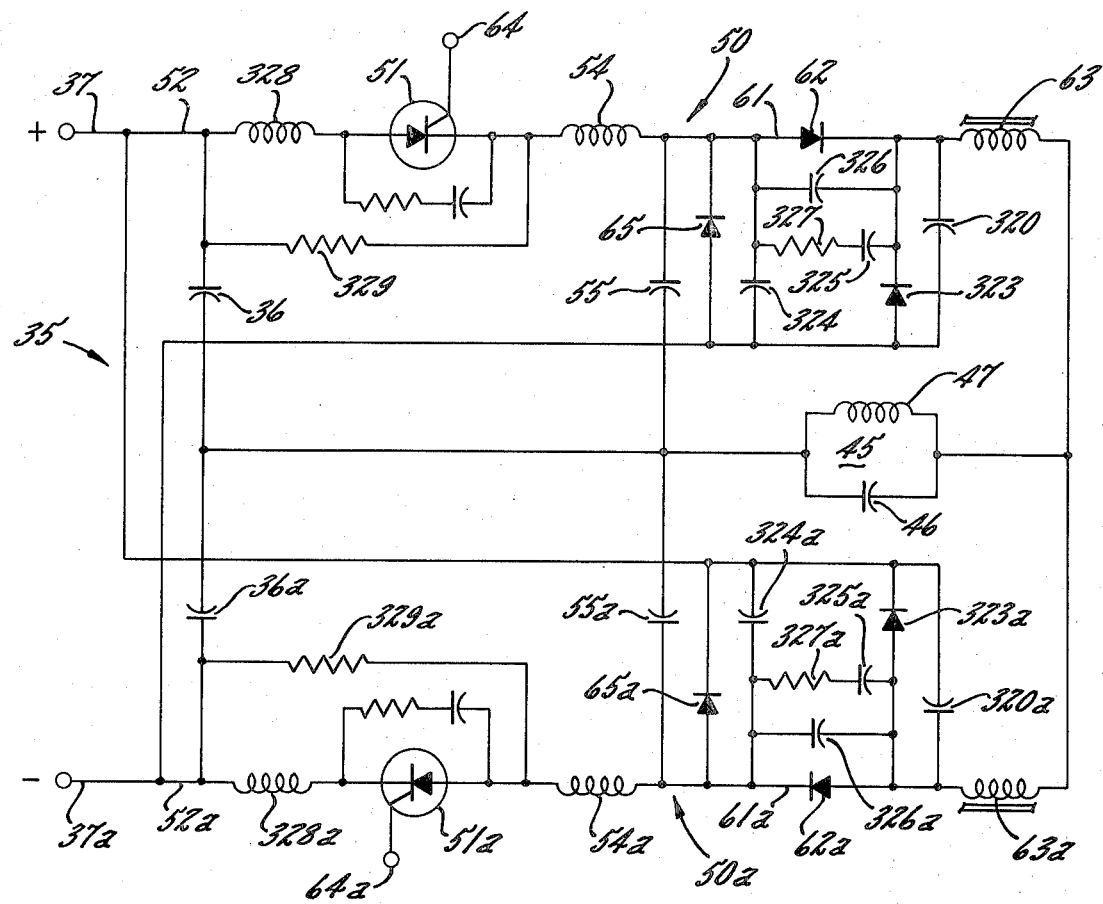

FIGS. 5a-c comprise a timing chart illustrating the operation of the power generator system shown in FIG. 1;

FIG. 6 is an electrical schematic of the voltage detector circuit shown in FIG. 1;

FIG. 7 is an electrical schematic of an alternate embodiment of the power inverter circuit shown in FIG. 2; and FIG. 8 is an electrical schematic of a modified and preferred embodiment of the power inverter circuit shown in FIG. 2.

While the invention is susceptible to various modifications and alternative forms, several illustrative embodiments thereof have been shown in the drawings which will be described in detail herein. It should be understood, however, that it is not intended to limit the invention to the particular form disclosed, but to the contrary, the intention is to cover all modifications, equivalents and alternatives falling within the spirit and scope of the invention as defined in the claims. For example, while the illustrative embodiment described herein shows the power generator coupled to the rectified output of a standard three phase, 460 volt, ac. supply line of the type generally found in industrial facilities, it is not intended to limit the invention to this particular arrangement. To the contrary, it is intended that the power generator of the present invention can be used in connection with any appropriate dc. power supply.

Referring to the drawings wherein the like reference numerals appearing in the several views refer to the same parts, there is shown in FIG. 1 a simplified block diagram of a power generator system constructed in accordance with the present invention. The generator includes a power section 10 and a control section 11, and is suitable to power an inductive load, such as the output coil used for induction heating purposes. The generator system converts input power drawn from a dc. supply into ac. output power having a frequency up to approximately 10 KHz. To accomplish that, there is an inverter circuit 12 comprising one or more capacitive storage circuits which are controlled by respective thyristors which, in turn, are sequentially gated or fired to permit the storage circuits to successively charge from the dc. input supply and then discharge through an associated ac. load. Typically, the dc. input power may be derived from a suitable ac. supply 13, such as the commercial power mains, by means of a full wave rectifier 14.

To control the sequencing in the inverter circuit 12 and to provide a basic reference frequency for the load, an oscillator 16, responsive to the output setting of an adjustable power regulator 17, is provided in the control section 11. The oscillator 16 triggers a clock pulse generator 18, and together, they drive a timer 20 to produce a train of sharp, substantially rectangular firing pulses. These pulses sequentially appear at the output terminals $20_c$–$20_d$ of the timer 20 and are fed via separate paths $22_c$ and $22_d$ to associated current amplifiers $24_c$ and $24_d$: the current amplifiers $24_c$ and $24_d$, in turn, drive respective pulse transformers $28_c$ and $26_d$ to provide time sequenced firing pulses for the thyristors of the inverter circuit 12.

To protect the thyristors and to insure that uniform output power is maintained despite possible variations in the load conditions, a number of separate control circuits can be included in the overall system. Several such circuits 31–34 have been shown in the illustrated embodiment of FIG. 1. Moreover, an inhibitor circuit 30 may also be included to override all other controls and to turn off the oscillator 16 if, for example, the reverse bias applied to any thyristor becomes excessive, or if an open or short circuit condition occurs in the system. The other control circuits 31–34 perform the following respective control functions: monitor the output frequency of the inverter circuit, monitor the output voltage of the inverter circuit, and monitor the output power being delivered to the load. Unlike the inhibitor circuit 30, however, these circuits do not control the on-off operation of the oscillator. Rather, they control the output frequency of the oscillator 16 to adjust the rate of sequencing occurring in the inverter circuit 12.

Referring then to FIG. 2 for a more detailed description of a suitable inverter circuit 12, a split-source dc. supply 35, formed by coupling a pair of capacitors 36 and $36_a$ in series across positive and negative dc. voltage lines 37 and $37_a$, is provided for supplying first and second balanced, but oppositely polarized, input sources to a thyristor switching arrangement which operates in push-pull to control the magnitude and frequency of the power supplied to a tuned load. While the load configuration will naturally vary depending upon the application for which the generator is used, it is shown in the illustrated embodiment as a 10 KHz tank circuit 45 comprising a power factor corrective capacitor 46 connected across a work coil 47. The tank circuit 45 is connected at one end to a neutral bus 48 and at the other end to a pair of oppositely poled switching paths 50 and $50_a$ which are employed on a time sequenced basis for alternately supplying half-cycles of positive and negative current to the tank circuit.

Considering the positively poled switching path 50, it will be seen that it comprises a thyristor 51 for selectively completing a charging path 52 for a series resonant circuit 53, including a linear reactor 54 and a storage capacitor 55. The linear reactor 54 limits the rate of change of the current flow through the power circuit of the thyristor 51 but not nearly as severely as would be the case were a saturable reactor employed. To complete the charging circuit, the capacitor 55 is returned to the neutral bus 48 and, therefore, it charges toward the dc. voltage source at a rate dependent upon the resonant frequency of the series resonant circuit 53. For maximum power, maximum frequency operation, the series resonant circuit 53 should be tuned to the same frequency as the output tank circuit 45. At the same time, the charging period for the capacitor 55 should be selected so as not to exceed the half period of the output signal from the inverter. Under these conditions, the thyristor 51 may be held in its nonconductive state for at least one half of each cycle thereby insuring ample "turn-off" time between successive periods of conduction by the thyristor 51 to enable its inherent junction capacitance to fully discharge and to thereby insure that it is in fact, gate controlled as described hereinbelow. As shown in the illustrated embodiment, the thyristor 51 is a single SCR, but it will be understood that a bank of parallel SCRs may be employed when necessary to provide ample power carrying capability.

The switching path 50 further comprises a discharge path 61 which couples the tank circuit 45 across the storage capacitor 55 and includes a blocking diode 62 and a saturable reactor 63. The diode 62 is appropriately poled to prevent back currents, resulting from oscillations in the tank circuit 45, from interferring with either the charging or discharging of the storage capacitor 55. The saturable reactor 63 isolates the resonant tank circuit 45 from the charging path 52 while the capacitor 55 is charging and thereafter assists in properly shaping the discharge current passing to the tank circuit 45.

Of course, the foregoing description is also applicable to the negatively poled switching path $50_a$. Accordingly, corresponding reference numerals have been used in relation thereto, together with the distinguishing subscript $a$, to indicate those components which correspond to the related components previously described in connection with the positively poled switching path 50.

The operation of the inverter circuit 12 may be understood more clearly by reference to the waveforms of FIG. 5. In connection herewith, it is assumed that the inverter is in its quiescent state at a time $t_0$ with the SCRs 51, $51_a$ both being non-conductive and with the input capacitors 36, $36_a$ being fully charged to provide a pair of matched input voltage supplies of $V_1$ and $V_2$, respectively. At a subsequent time $t_1$, the control section 11 is energized as described below to provide respective, time staggered trains of firing pulses for alternately triggering the SCRs 51 and $51_a$ into conduction. Following start-up at time $t_1$, the level of output power from the inverter 12 gradually increases during the first few cycles of operation until it reaches its desired operating level at a time $t_2$. To avoid unnecessary complications in connection with the present description, however, the transient conditions existing between times $t_1$ and $t_2$ have not been shown in the drawings.

Referring to FIG. 5b, a firing pulse $\overline{F}_d$ is generated in the control circuit of the generator at a time $t_4$ and applied directly to the gate terminal $64_a$ of the negatively poled SCR $51_a$. The application of this firing pulse $\overline{F}_d$ triggers the SCR $51_a$ into conduction, thereby providing a closed current path through the charging circuit $52_a$. This places the source voltage $V_2$ across the series resonant circuit $53_a$, thereby causing the storage capacitor $55_a$ to begin charging from the dc. supply line $37_a$. To protect the SCR $51_a$ against damage due to switching transients, the rate of change of the current (di/dt) through its anode-cathode power circuit must be limited since otherwise there is danger that it will overheat and, therefore, fail. To that end, a high frequency ac. bypass circuit may be coupled across the SCR to serve as a transient suppressor, but the primary rate limiting must still be provided by the reactor $54_a$.

During the conduction period of the SCR $51_a$, the associated storage capacitor $55_a$ continues to charge until the voltage $V_6$ across it reaches a maximum level at time $t_6$. Due to the storage capabilities of the inductor $54a$ in the series resonant circuit $53a$, the capacitor $55_a$ charges to a voltage level which exceeds the level of the negative supply voltage $V_2$. Since the firing pulse $\overline{F}_d$ has been removed prior to this time, the voltage across the storage capacitor $55_a$ reverse biases the SCR $51_a$ causing it to commutate to a state of non-conduction. The subsequent discharge of the storage capacitor $55_a$ is controlled by the saturable reactor $63_a$. The saturating characteristics of this reactor should be such that it presents a very high impedance while unsaturated and a very low, preferably linear, impedance when saturated. Thus, the tank circuit 45 is effectively isolated from the storage capacitor $55_a$ during each charging cycle and for a brief interval thereafter by the saturable reactor $63_a$ to insure sufficient turn-off time for the thyristor $51_a$. As will be appreciated by those skilled in the art, the ability to provide additional turn-off time in this manner is particularly important when operating the inverter at high output frequencies.

Once the saturable reactor $63_a$ saturates, the storage capacitor $55_a$ is allowed to discharge to the output tank circuit 45. The rate of discharge is controlled by the RC time constant of the saturated reactor $63_a$ and the storage capacitor $55_a$. In connection herewith, it has been found preferable to also select a discharge time constant which does not exceed the half period of the ac. output signal from the inverter.

More particularly, the wave form of the discharge current from the capacitor $55_a$ is shown in FIG. 5c. As will be seen, the reactor $63_a$ saturates at a time $t_6$ such that the impedance in the discharge path $61_a$ then drops to a low level, thereby enabling the storage capacitor $55_a$ to rapidly discharge through the reactor $63_a$ and into the resonant circuit 45. It should be noted with reference to FIG. 5c that, due to the oscillations which occur in the tank circuit 45, the voltage across the capacitor $55_a$ reverses itself upon discharge and begins to go positive. To protect the SCR $51_a$, this voltage swing across the capacitor is prevented from exceeding the level of the positive source voltage $V_1$ by inserting clamping diode $65_a$ between the discharge circuit path $61_a$ and the positive dc. supply line 37. In addition, the clamping diode $65_a$ provides a return path to the source 35 for excess energy which the tank 45 will not accept.

Likewise, with regards to the positively poled switching path 50, at a subsequent time $t_8$ the positively poled thyristor 51 is "turned on" by a firing pulse $\overline{F}_c$ applied to its gate terminal 64. As a result, the thyristor 51 becomes conductive and the positive source voltage $V_1$ is connected directly across the resonant circuit 53 causing the storage capacitor 55 to begin charging. As described with reference to the negatively poled switching path $50_a$, the voltage $V_5$ developed across the capacitor 55 eventually exceeds the source voltage $V_1$ so as to back bias the thyristor 51 causing it to commutate. Subsequently, the saturable reactor 63 saturates allowing the storage capacitor 55 to then discharge into the tank circuit 45. This sequencing continues to repeat itself, during operation with positive and negative half cycles of current being discharged into the 10 KHz resonant tank once every third cycle, assuming load conditions remain constant. The effect being that the respective half waves of current ring through the remaining two cycles to provide output power at the 10 KHz frequency of the tank circuit 45. The maximum output power which the generator circuit is capable of providing is limited by this arrangement. But, if higher power levels are desired, a plurality of power sections 10 can be utilized on a time sharing basis for providing current to a common load. By way of illustration, assume that three identical power sections 10 are coupled to a common tank circuit. If firing pulses are sequentially applied alternately to the opppositely poled thyristors in the respective power sections so that each thyristor conducts once every third cycle, the output tank circuit would receive one positive and one negative half wave of current each cycle. The resulting increase in available power, when compared to the illustrated embodiment, is readily apparent.

Figure 3:
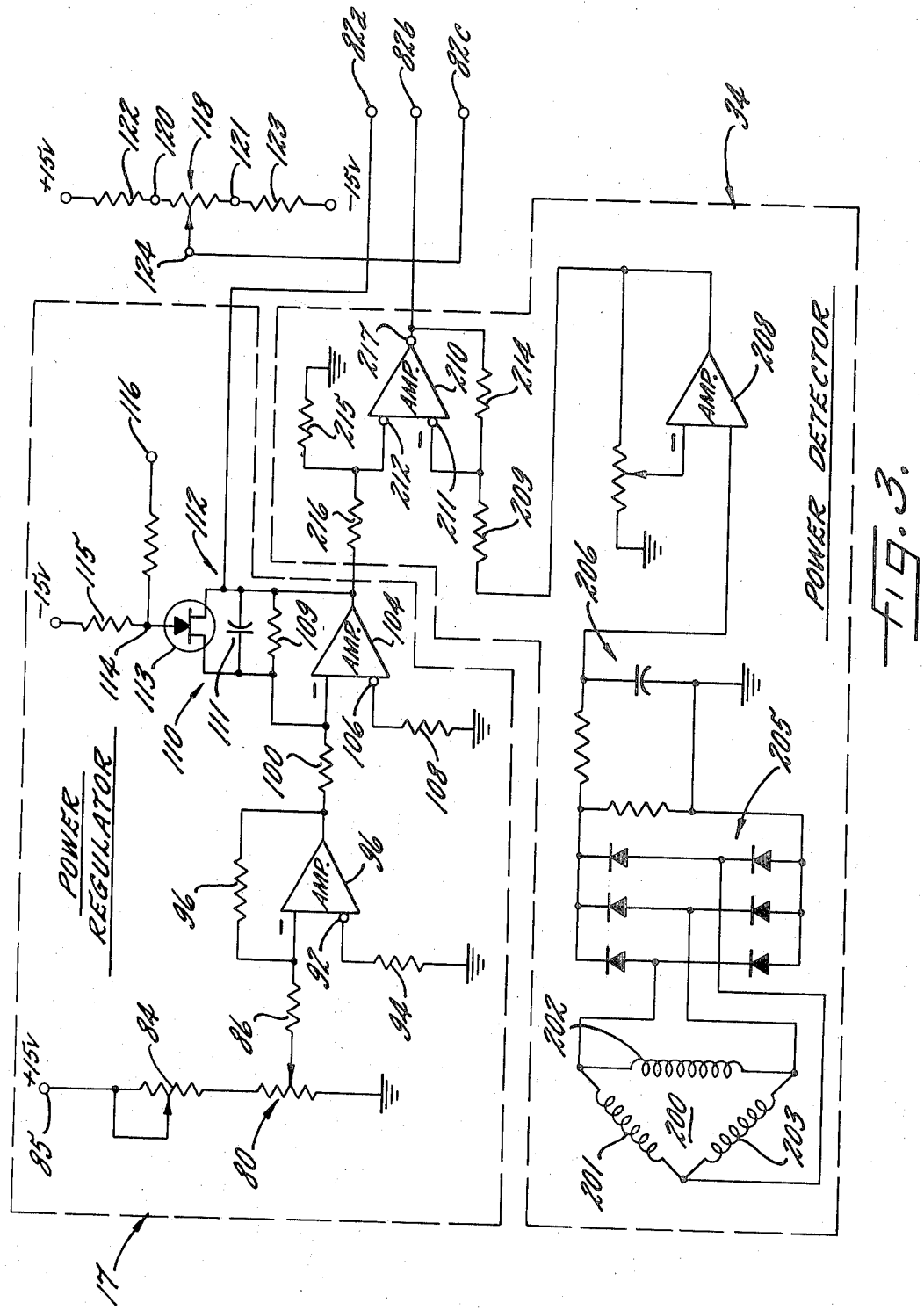
FIG. 3 is an electrical schematic of the power regulator and power detector circuits shown in FIG. 1.

Since the required amount of output power demanded from the inverter 12 will often vary from use to use, means are provided in keeping with the invention to enable an operator to select the level of output power desired. To this end, a power regulator circuit is shown in FIG. 3 wherein a given setting on a regulator dial results in a corresponding control voltage being applied to a frequency control circuit 82, thus establishing the operating frequency of the control oscillator 16. More particularly, a potentiometer 80 and a rheostat 84 are connected in series between the terminal 85 of a positive bias supply and ground. The setting of the rheostat 84 limits the maximum output power which may be called for, thereby permitting the potentiometer 80 to be adjusted to provide a set point voltage corresponding to the power actually desired. The power set point voltage at the slider of the potentiometer 80 is applied to the control terminal $82_a$ of the frequency control circuit 82 through a pair of series connected, inverting mode operational amplifiers 90 and 104. In keeping with conventional practices, each of these operational amplifiers 90, 104 has an input resistor 86, 100 and a feedback resistor 96, 109 to set their closed loop gains. Likewise, their noninverting inputs 92, 106 are returned to ground through respective drift stabilizing resistors 94 and 108.

As a feature of the invention, the power regulator 17 includes an integrating ramp-start circuit 110 which acts upon the set point voltage signal to cause the output power from the inverter 12 to climb gradually to its pre-set level. By limiting the power rise in this manner, undesirable transients are avoided and the initial settling time for the inverter output is minimized. In connection herewith, a capacitor 111 is shunted across the feedback resistor 109 causing the operation amplifier 104 to function as an integrator. The output signal from the amplifier 104 will not, therefore, immediately reflect changing input conditions. Rather, the output will exponentially approach the level of a changing input signal with the rate of response being set by the RC time constant of the resistor 109 and the capacitor 111. To this end, a field effect transistor (FET) 113 is shunted across the feedback circuit 112 of the amplifier 104. Since the gate 114 of this transistor is connected through a resistor 115 to a negative bias supply and since no signal appears at the control terminal 116 when the control oscillator 16 is switched-on, the transistor 113 remains non-conductive under these conditions and has no effect upon the output of the power regulator circuit. When the control oscillator is switched-off, however, a positive control voltage is applied to the terminal 116 and the transistor 113 switches to its conductive state. This, in turn, effectively short circuits the feedback circuit 112 of the amplifier 104 causing the gain through the power regulator circuit 17 to drop to zero. Thus, the control voltage to the frequency control circuit 82 is the same as it would be if the potentiometer 80 was set to a zero power level.

To insure the accuracy of the power regulator settings, a reference circuit 117 is provided for use in calibrating the potentiometer 80. To this end, the respective ends 120, 121 of a reference potentiometer 118 are connected through matching resistors 122, 123 to like bias supplies of opposite polarity and the set point terminal 124 of the potentiometer is connected to an input terminal 82c of the frequency control circuit 82. For purposes of calibration, the setting on the reference potentiometer 118 can be adjusted as needed to insure that no control voltage appears in the frequency control circuit 82 when a zero power setting appears on the potentiometer 80.

Figure 4:
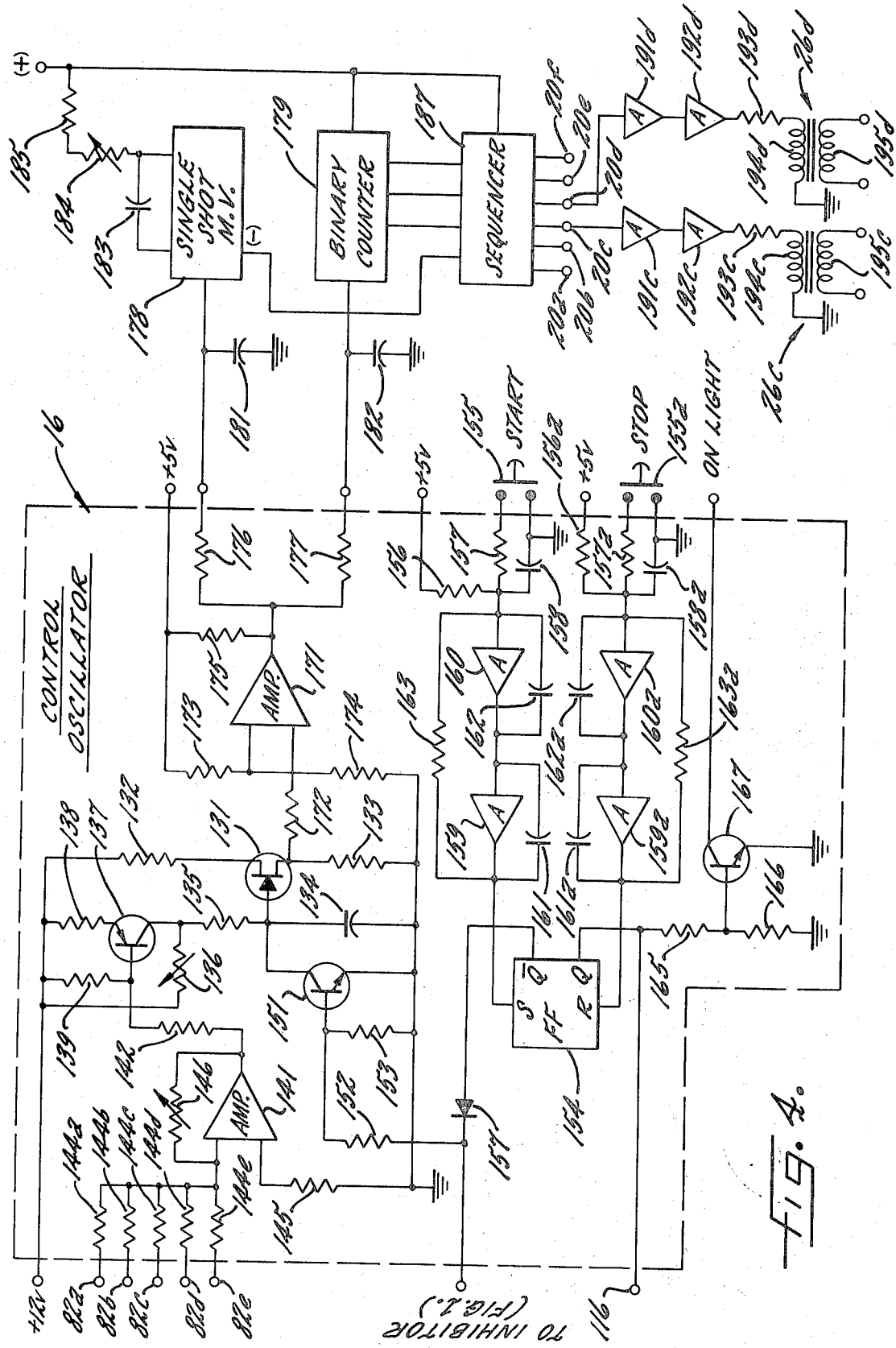
FIG. 4 is an electrical schematic of a main portion of the control section of the power generator shown in FIG. 1, including the oscillator circuit, the timing circuit and the firing circuit.

Referring to FIGS. 4 and 5, the control oscillator 16 may suitably comprise a relaxation oscillator of the sawtooth generator-type. Thus, in the illustrated embodiment it includes a unijunction transistor 131 which has its base-1 coupled to a suitable bias supply source via a resistor 132 and its base-2 returned to ground through a resistor 133. The values of the resistors 132 and 133, of course, establish a predetermined firing potential for the unijunction transistor. The unijunction transistor is operated as a base-2 follower to provide a cyclical sawtooth, frequency controlled signal $V_s$. To that end, a capacitor 134 is connected between the bias supply and ground by a series resistance comprised of a fixed resistor 135 and the combination of an adjustable resistor 136 in parallel with the collector-emitter circuit of a transistor 137 and its emitter bias resistor 138. Further, the capacitor 134 is coupled across the emitter-base-2 circuit of the unijunction transistor, with the result that it exponentially charges at a rate dependent on the series resistance 135–138 until the voltage across it $V_c$ reaches the firing potential for the unijunction transistor 131 at which point the capacitor rapidly discharge through the emitter-base-2 circuit of the transistor. Hence, it will be appreciated that the capacitor 134 cyclically charges and discharges at a frequency determined by the series resistance 135–138 and the firing potential for the unijunction transistor 131.

The frequency of the control oscillator 16 is controlled to maintain the output power from the inverter at its set point. For that reason, the transistor 137 is included in the frequency control circuit 82 for the oscillator to permit the series resistance 135–138 to be readily adjusted under the control of the control signals applied to the input terminals $82_a$–$82_e$ of the control circuit. Preferably, the range of possible output frequencies from the control oscillator extends from a lower limit determined by the setting of the adjustable resistor 136 to an upper limit determined by the value of the emitter bias resistor 138. Accordingly, the base of the transistor 137 is connected by a bias resistor 139 to the bias supply source and by a current limiting resistor 142 to the output of an operational amplifier 141. The control signals for the oscillator are applied by equally weighted resistors $144_a$–$144_e$ to a summing node at the inverting input of the operational amplifier 141. The operational amplifier further has its noninverting input returned to ground by a drift stabilizing resistor 145 and a feedback resistor 146 extending between its output and inverting input terminals. The feedback resistor 146 may be variable to permit the gain of the operational amplifier 141 to be adjusted to provide proportional control over the conduction of the transistor 137. Specifically, the gain of the operational amplifier 141 should be adjusted so that conduction of the transistor 137 increases as a function of the sum of the control signals from a state of non-conduction in the absence of any control signal to a state of saturated conduction when the sum of the control signals reaches a level calling for the maximum output frequency available from the control oscillator.

Provision may also be made to turn the control oscillator 16 on and off automatically and manually. To that end, a transistor 151 has its collector-emitter circuit connected across the capacitor 134 such that the oscillator is on only if the transistor 151 is in its non-conductive state. The transistor 151 is switched between its conductive and non-conductive states under the control of signals applied to its base via a current limiting resistor 152. To permit the transistor to be rapidly switched, a resistor 153 may be connected across its base-emitter junction thereby providing a path for quickly discharging the transistor's junction capacitance.

The automatic on-off control of the oscillator is provided by the aforementioned inhibitor circuit 30 (FIG. 1). Any turn-off signal that circuit may supply is applied through the current limiting resistor 152 to switch the transistor 151 into conduction. The oscillator cannot thereafter be turned back on until the condition responsible for the inhibiting signal has been eliminated, and there is, therefore, a built in safeguard preventing operation of the inverter under potentially damaging conditions.

The manual on-off control is afforded by a flip-flop circuit 154 under the control of a pair of push-buttons 155 and 155$_a$, the former a start button and the latter a stop button. As shown, the flip-flop changes states in response to the negative going transitions of its input signals and has its reset output $\bar{Q}$ coupled via a blocking diode 157 and the current limiting resistor 152 to the base of the transistor 151. The blocking diode 157 is poled to prevent any inhibiting signal supplied by the inhibitor circuit 30 (FIG. 1) from being dissipated by the flip-flop. The control oscillator 16 is turned on at, say, time $t_1$ by depressing the start button 155 to complete the return path for a voltage divider formed by a pair of resistors 156 and 157. Specifically, when the start button is depressed the voltage at the midpoint of the voltage divider drops to provide a set pulse for the flip-flop 154, thereby causing its set output Q to go to a high level ("1") and its reset output $\bar{Q}$ to drop to a low level ("0"). Likewise, when the stop button 155$_a$ is depressed at time $t_{11}$, it completes a return path for a voltage divider formed by another pair of resistors 156$_a$ and 157$_a$, thereby causing the voltage at the midpoint of that voltage divider to drop which, in turn, causes the flip-flop 154 to reset such that its set output Q goes low ("0"), as its reset output $\bar{Q}$ goes high ("1"). As will be appreciated, the transistor 151 is switched from its conductive state to its non-conductive state to turn on the oscillator 16 when the flip-flop is set. On the other hand, when the flip-flop is reset, the transistor 151 is switched from its non-conductive state to its conductive state to turn-off the oscillator.

Certain refinements may, of course, be included in the manually operated on-off circuit. For example, to prevent the high frequency noise that may be present from causing false triggering of the flip-flop circuit 154, the midpoints of the voltage dividers 156, 157 and 156$_a$, 157$_a$ may be returned to ground through respective ac. bypass capacitors 158 and 158$_a$. For further noise protection, the midpoints of the voltage dividers 156, 157 and 156$_a$, 157$_a$ may be coupled to the set and reset inputs of the flip-flop circuits 154 via respective pairs of series connected inverting amplifiers 159, 160 and 159$_a$, 160$_a$. The amplifiers have respective feedback capacitors 161, 162 and 161$_a$, 162$_a$ to provide high frequency negative feedback which tends to suppress any noise that may be present, and the amplifier pairs have respective feedback resistors 163 and 163$_a$ to provide positive feedback which enhances their response to the appearance of the set and reset pulses for the flip-flop. As another example, a lamp or the like may be turned on and off under the control of the flip-flop circuit 154 to enable the operator to determine whether the manual controls are set for operation of the control oscillator 16 or not. Hence, in the illustrated embodiment, the reset output of the flip-flop 154 is returned to ground through a pair of resistors 165 and 166 and the junction between those resistors is coupled to the base of a transistor 167 so that the transistor 167 is switched into and out of conduction to energize and de-energize an indicator light as the flip-flop 154 is set and reset.

In accordance with the present invention, high energy, fast rise time, short duration firing pulses are supplied for the SCRs 51 and 51$_a$ to increase the maximum permissible rate of change of the current flow (di/dt) through their anode-cathode power circuits, thereby obviating the usual requirement for rate limiting saturable reactors. The triggering pulses are generated under the control of the control oscillator 16, with the result that their frequency or repetition rate depends on the oscillator output frequency. In the illustrated embodiment, the repetition rate of the triggering pulses is only one-sixth the output frequency of the control oscillator. Accordingly, the output frequency of the control oscillator 16 may suitably be adjustable upwardly and downwardly from a nominal frequency of, say, 20 KHz., thereby establishing 3.3 KHz. as the nominal repetition rate for the triggering pulses.

More particularly, there is an open loop operational amplifier 171 which has its inverting input coupled across the output of the sawtooth generator 131–138 by a resistor 172, its non-inverting input coupled to the junction between a pair of resistors 173 and 174, and its output connected to a positive bias supply by a load resistor 175. The resistors 173 and 174 extend between the positive bias supply and ground, to form a voltage divider such that the non-inverting input of the operational amplifier 171 is referenced to a predetermined positive voltage. Thus, since the operational amplifier is in an open loop configuration, its output rapidly swings between the bias supply voltage level and ground as the sawtooth signal $V_s$ drops below and rises above the level of the predetermined reference voltage. Consequently, a train of shaped pulses having a frequency or repetition rate corresponding to the frequency of the sawtooth signal $V_s$ is provided as the ultimate output signal $V_{osc}$ from the control oscillator 16.

The output pulses from the control oscillator are applied by respective resistors 176 and 177 to the inputs of a single-shot multivibrator 178 and a binary counter 179. For noise filtering purposes, the inputs to the multivibrator and counter are preferably shunted to ground by respective high frequency ac. bypass capacitors 181 and 182. The single shot multivibrator 178 is triggered by each pulse from the control oscillator 16 to provide a train of very fast rise time clock pulses $P_c$ which have a frequency or repetition rate corresponding to that of the control oscillator. The clock pulses $P_c$, however, have a fixed duration dependent on the values selected for the usual cross-coupling capacitor 183 and load resistors 184 and 185. Indeed, the duration of each clock pulse is preferably less than 20 microseconds (it may be as low as 12–18 microseconds) and the clock pulse rise time should not exceed 150 nanoseconds. The binary counter 179, on the other hand, typically comprises a three stage ring counter which is advanced one count by each pulse from the control oscillator 16. Such a counter is capable of providing six discrete output codes (even if the all zeroes code is suppressed) using only three parallel outputs to supply the bits $B_1$, $B_2$ and $B_3$ for the binary places $2^0$, $2^1$ and $2^2$, respectively. Of course, with such a counter, each code word cyclically recurs at a frequency one-sixth that of the control oscillator 16.

The clock pulses $P_c$ and the code words $B_1$-$B_3$ are applied to a sequencer 187 which responds to the successive code words or counts to sequentially gate or route the clock pulses to its respective outputs $20_a$-$20_f$, thereby enabling the sequencer to provide the time staggered output pulses $F_a$-$F_f$. These pulses have a duration and rise time closely corresponding to those of the clock pulses $P_c$, but their repetition rate is only one-sixth that of the clock pulses.

When only two oppositely poled SCRs are employed in the inverter, only two of the outputs of the sequencer 187 need be employed. For example, the firing pulses $\bar{F}_c$ for the positively poled SCR 51 are obtained by passing the pulse $F_c$ through an inverting current amplifier $191_c$ to a non-inverting current amplifier $192_c$ and then through a current limiting resistor $193_c$ to the primary winding $194_c$ of the pulse transformer $26_c$ so that a firing pulse $\bar{F}_c$ is induced into the transformer secondary winding $195_c$ in response to each pulse $F_c$. Likewise, the firing pulses $\bar{F}_d$ for the negatively poled SCR $51_a$ are obtained by passing the pulses $F_d$ through a similar inverting-type current amplifier circuit $191_d$-$195_d$. The current amplifiers $191_c$, $192_c$ and $191_d$, $192_d$ should be selected so that the firing pulses $\bar{F}_c$ and $\bar{F}_d$ are high energy pulses on the order of one amp or so. Also, the pulse transformers $26_c$ and $26_d$ should be characterized by having no more than about 10–15 percent overshoot in response to the desired fast rise time, high energy firing pulses in the interest of maintaining the voltage transients at a relatively low level so as to protect the control logic circuit and to prevent the SCRs from being overdriven.

As a feature of the invention, a power detector circuit 34 is provided to insure that the actual power being delivered to the resonant tank circuit 45 is maintained at the level set by the power regulator circuit 17. To this end, sensor means are provided for detecting the amount of actual power being delivered to the inverter circuit 12, and a comparator circuit is provided for detecting any deviation of the actual power level from its desired or set point level. Thus, referring to FIG. 3, the power detector circuit 34 includes a high impedance current transformer 200 have windings 201, 202, and 203 which are connected in a delta configuration across the respective phases of the three phase ac. supply 14. Hence, an ac. voltage corresponding to the amount of power being drawn by the inverter circuit 12 is induced in the current transformer 200. By applying this ac. voltage signal to a diode rectifier circuit 205 and a filter circuit 206, a dc. control signal is provided which directly corresponds to the amount of actual power being drawn by the generator system. This dc. signal is applied, via an operational amplifier 208 and a current limiting input resistor 209, to the inverting input terminal 211 of a second operational amplifier 210. This second amplifier 210, which includes a conventional feedback resistor 214 and a drift stabilizing resistor 215, is operated as a differential comparator with the set point voltage signal from amplifier 104 being applied through resistor 216 to its non-inverting input terminal 212. Hence, when the actual power level does not coincide with the desired power level, an appropriate control voltage appears at the output terminal 217 of the differential comparator 210 and is applied directly to the control terminal $82_b$ of the frequency control circuit 82. This in turn causes an adjustment in the output voltage of the operational amplifier 141 causing a corresponding change in the operating frequency of the control oscillator 16.

The effect of applying a control voltage to the frequency control circuit 82 can be seen by reference to FIG. 5. Assume that, due to changing load conditions, the operating level of the power generator drops below the desired output level at time $t_9$. There is then a positive control voltage at the output terminal of the differential comparator 210 which increases the forward bias $V_{BE}$ across the base-emitter junction of the transistor 137 causing the transistor to conduct harder and resulting in a corresponding increase in the operating frequency of the control oscillator 16. The effect is to reduce the time interval between successive firing pulses $\bar{F}$ causing an increase in the number of current pulses, i.e., the amount of power, being supplied per unit time to the tank circuit 45. As the output power level of the inverter gradually increases to the desired operating level, this is reflected back to the comparator 210 causing a corresponding decrease in the voltage of the frequency control circuit 82, until at time $t_{10}$ the control voltage disappears entirely.

As an additional feature of the invention, a voltage detector circuit 32 is provided to insure that the output voltage of the inverter circuit 12 does not exceed a predetermined operating level. As seen in FIG. 6, the voltage detector circuit includes an appropriate step-down transformer 230 having a primary winding 231 and a secondary winding 232. By coupling the terminals 233 and 234 of the primary winding 231 of this transformer across the work coil 47 of the tank circuit 45, a voltage is induced in the secondary winding 232 which is proportional to the output voltage of the inverter circuit 12. By passing this voltage signal through a diode rectifier circuit 236 and a filter circuit 238, a corresponding dc. signal is obtained which is then applied to the non-inverting input terminal 246 of a differential comparator 245. This signal is, in turn, compared against a reference signal set by a reference potentiometer 248 and applied to the non-inverting input terminal 247 of the comparator via a current limiting resistor 250. When the output voltage from the inverter circuit 12 exceeds the desired operating voltage, a negative control voltage appears at the output terminal 251 of the differential comparator 245 and is applied via a blocking diode 255 to the control terminal $82_d$ of the frequency control circuit 82. This in turn reduces the level of the output voltage from the operational amplifier 141 causing a corresponding decrease in the operating frequency of the control oscillator 16.

As a refinement to this feature of the invention, an indicator circuit is provided which causes a signal bulb to light when an excessive voltage condition is detected. To this end, an operational amplifier 260 is provided in an open-loop configuration with its output connected via a resistor 264 to a positive bias supply.

Since the inverting and non-inverting inputs 261 and 262 of this amplifier are connected via current limiting resistors 265 and 266 to either side of the blocking diode 255, the signal bulb 270 remains in an off condition so long as the voltage detected across the work coil 47 does not exceed the preset voltage limit. When, however, the operating voltage exceeds the preset limit, the amplifier 260 becomes saturated driving the output signal at terminal 263 to ground. By applying this negative going signal to both input terminals of a NAND gate 272, a positive going output signal is provided which is then applied, via a current limiting resistor 274, to the base terminal 281 of a transistor 280. This switches the transistor 280 into conduction causing the signal bulb to turn-on as a result of the current flow between the positive bias supply 285 and ground. While not shown in the drawings, it will be appreciated that similar indicator circuits could be included in connection with each of the other control circuits mentioned herein.

Referring to FIG. 7, there is shown a modified embodiment of the inverter circuit 12 which is particularly well suited for operating at high frequency levels. In connection herewith, the blocking diodes 62, 62$_a$ and the saturable reactors 63, 63$_a$ (FIG. 2) have been removed from the respective discharge paths 61 and 61$_a$ of the oppositely poled switching paths 50, 50$_a$, and appropriately poled thyristors (SCRs) 300 and 300$_a$ have been inserted, together with linear reactors 302 and 302$_a$ in their place. By gating each of the SCRs 300 and 300$_a$ into conduction alternately with respect to the corresponding SCR 51, 51$_a$ located in the same switching path, complete isolation is obtained between the respective charging and discharging portions of each switching path 50, 50$_a$. Consequently, an exceptionally high degree of control is obtained over the respective charging and discharging cycles of each of the storage capacitors 55, 55$_a$, thus insuring that sufficient turn-off time is available each cycle for commutating the respective SCRs 51, 51$_a$. To this end, the gate terminals 301 and 301$_a$ of the discharge circuit SCRs 300 and 300$_a$ are connected via firing circuits, similar to those previously described (FIG. 4), to the output terminals 20$_a$ and 20$_e$ of the sequencer 187. Accordingly, it can be seen by reference to the firing pulses shown in FIG. 5b that the charging path portion 51, 51$_a$ and the discharging path portion 61, 61$_a$ of each switching path 50, 50$_a$ are isolated from one another during the respective charging and discharging cycles of the storage capacitor 55, 55$_a$ located therein, thus providing an exceptionally high degree of control over the current flow to the output tank circuit 45.

In keeping with the invention, it has been found desirable to make certain further modifications in the inverter circuit of FIG. 2 in order to increase the operating efficiency of the inverter and to insure that the SCRs are provided with adequate turn-off time during full power operation at high frequencies. These modifications are shown in the preferred embodiment of FIG. 8. To this end, a pair of capacitors 320, 320$a$ have been inserted, together with the additional clamping diodes 323, 323$a$, in the respective discharge paths 61, 61$a$ of the oppositely poled switching paths 50, 50$a$.

Referring to the positive poled switching paths 50, the capacitor 320 is connected between the blocking diode 62 and the saturable reactor 63 to provide a circuit path which enables back currents to flow through the saturable reactor 63 during the discharge cycle of the negatively poled switching path 58, thus providing additional turn-off time by assisting in the rapid reset of saturable reactor 63. Diode 323 also assists in resetting the saturable reactor 63 by virtue of the finite amount of leakage current at its diode junction. In addition, this diode 323 functions together with diode 65 as an output load clamp for returning unused reactive energy to the source. Capacitors 324–326 and resistor 327 are also connected in the discharge path 61 of the circuit of FIG. 8. These components act as transient suppressors for protecting diodes 62 and 65 from voltage transients appearing in the circuit.

As a further feature of this embodiment, bleeding resistors 329, 329$a$ are coupled to the charging paths 52, 52$a$ of the respective switching circuits 50 and 50$a$. These resistors 329, 329$a$ provide circuit paths for discharging the storage capacitors 55, 55$a$ when the power generator is shut down. These resistors do not appreciably affect the operation of the inverter circuit 12 but rather are provided as a safety feature for protecting personnel who might come in contact with the equipment. Similarly, additional linear reactors 328, 328$a$ have been inserted in the charging paths 52, 52$a$ of the respective switching circuits. These reactors 328, 328$a$ provide additional power supply isolation between the positive and negative supply lines, as well as providing additional means for controlling the rate of change of current through the thyristors 51, 51$a$.

What is claimed is:

1. A static power generator for supplying an inductive load with a.c. power at a predetermined frequency up to at least 10 KHz. in response to energy from a d.c. power supply, said generator comprising a thyristor having a power circuit and a control circuit; a capacitive storage means coupled across said power supply by a charging path and across said load by a discharge path, said charging path including the power circuit of said thyristor coupled in series with a linear inductive element for limiting the time rate of current charge (di/dt) through said thyristor; and means for cyclically and rapidly switching said thyristor into a conductive state, including driven means for supplying a train of sharp, substantially rectangular firing pulses each having a duration of not more than 20 microseconds, said thyristor being latched in said conductive state for a period each cycle sufficient to permit charging of said storage means, whereby said storage means is cyclically and sequentially charged by energy from said power supply and discharged through said load to provide said a.c. power.

2. A static power generator for supplying ac. output power to a load at a predetermined frequency up to at least 10 KHz. in response to energy from a dc. power supply, said power generator comprising
    a power inverter circuit, including
        first and second dc. voltage supply lines of opposite polarity,
        a capacitor voltage divider connected across said supply lines providing first and second input voltage sources in series,
        output means coupled to a point between said voltage sources for delivering generator power to the load,
        switching means for selectively controlling current flow between said input sources and the load, said switching means comprising a first switching path including a charging circuit connected across a first one of said voltage sources and responsive for conduction to a control signal, said charging circuit including at least one thyristor coupled to a series resonant circuit including a linear inductive element and a capacitive storage element a discharge circuit coupled to said charging circuit for transferring stored energy from the series resonant circuit to said output means, said discharge circuit including uni-directional conductive means, including a second inductive element, for controlling current flow to said load, and limit means for protecting the thyristor in said charging circuit, said limit means including at least one clamping diode coupling said discharge circuit to the second of said voltage sources; and means for providing control signal to said switching means including clock means for sequentially applying sharp, substantially rectangular high amplitude firing pulses of less than approximately 20 microseconds duration to said thyristor at predetermined intervals to cyclically and rapidly gate said thyristor into conduction, whereby energy is stored in the series resonant portion of said charging circuit during each conduction period of said thyristor and thereafter discharged through said discharge circuit to the load.

3. A static power generator for supplying ac. output power to a load at a predetermined frequency up to at least 10 KHz. in response to energy from a dc. power supply, said power generator comprising, a power inverter circuit, including first and second dc. voltage supply lines of opposite polarity, a capacitor voltage divider connected across said supply lines providing first and second input voltage sources in series, output means coupled to a point between said voltage sources for delivering generated power to the load, switching means for selectively controlling current flow between said input sources and the load, said switching means comprising first and second oppositely poled switching paths coupled respectively to said first and second voltage sources, each of said switching paths including a charging circuit responsive for conduction to a control signal and comprising at least one thyristor coupled to a series resonant circuit including a first linear inductive element and a capacitive storage element a discharge circuit coupled to said charging circuit for transferring stored energy from the capacitive storage element in said switching path to said output means and comprising uni-directional conductive means, including a second inductive element, for controlling current flow to said load, limit means for protecting the thyristors in said switching paths, said limit means including at least one clamping diode coupling each of said respective discharge circuits to the oppositely poled voltage source; and means for providing control signals to said switching means including clock means for sequentially applying sharp, substantially rectangular high amplitude firing pulses of less than approximately 20 microseconds duration alternately to the thyristors in said oppositely poled switching paths at predetermined intervals to cyclically and rapidly gate said thyristors into conduction, whereby the capacitive storage element in one of said switching paths charges while the capacitive storage element in the other, oppositely poled switching path discharges into the common load.

4. A static power generator as set forth in claim 3 wherein said means for supplying control signals to said switching means comprises an oscillator, a clock pulse generator responsive to the output frequency of said oscillator, and digital sequencer means controlled by said clock pulse generator and responsive to the output frequency of said oscillator for emitting, in sequence, said train of sharp, substantially rectangular firing pulses.

5. A static power generator as set forth in claim 4 further comprising a power regulator circuit, said power regulator circuit including means for setting the operating level of the power generator by selectively adjusting the operating frequency of the oscillator, means for controlling the rate at which the oscillator will respond to changes in the operating level settings, and means for overriding said means for setting the operating level of the generator when said oscillator is turned off so as to simulate a zero power level setting and to minimize current drain through the oscillator when the power generator is idle.

6. A static power generator as set forth in claim 5 further including sensor means for detecting the amount of power being drawn by the load, and comparator means for comparing the level of the power actually being drawn against the power level setting of the regulator circuit and for applying a corrective signal to the oscillator when a difference appears between said power levels.

7. A static power generator as set forth in claim 5 further including sensor means for detecting the actual voltage level at which said output power is supplied to the load, and comparator means for comparing said actual voltage against a pre-set voltage and for applying a corrective signal to the oscillator when the output voltage exceeds the pre-set level.

8. A static power generator as set forth in claim 3 wherein said charging circuit and said discharge circuit are characterized by respective charging and discharging periods not exceeding more than one half the period of the generated output frequency.

9. A static power generator as set forth in claim 3 wherein said thyristors are silicon rectifiers and a plurality of said power inverter circuits are combined in parallel relationship and driven by said means for providing control signals for providing energy, on a time sharing basis, to a common load.

10. A static power generator as set forth in claim 3 wherein the uni-directional conductive means in the discharge circuit of each of said oppositely poled switching paths comprises a blocking diode connected in series with a saturable reactor, said saturable reactor being sized to remain unsaturated during the conduction period of the associated charging circuit and thereafter for a period of time sufficient to cause the thyristor in said charging circuit to commutate, whereby the respective charging and discharging circuits of each of said switching paths are effectively isolated from one another during the respective charging and discharge cycles of the storage element located therein.

11. A static power generator as set forth in claim 3 wherein the uni-directional conductive means in the discharge circuit of each of said oppositely poled switching paths comprises at least one thyristor connected in series with a second linear inductive element, said discharge circuit thyristors being operatively coupled to said means for providing control signals for conducting alternately with the corresponding charging circuit thyristor located in the same switching path, whereby the respective charging and discharge circuits of each of said switching paths are isolated from one another during the respective charging and discharge cycles of the storage element located therein.

12. An improved control circuit, particularly suited for use in a static high frequency power generator of the type which includes a power inverter circuit in which thyristors and inductive elements are utilized in controlling the alternate charging and discharge of capacitive storage means, for cyclically and rapidly firing thyristors into conduction, said control circuit comprising an oscillator, a clock pulse generator responsive to the output frequency of said oscillator, digital sequencer means controlled by said clock pulse generator and responsive to the output frequency of said oscillator for emitting, in sequence, a train of sharp, substantially rectangular firing pulses each having a duration of not more than 20 microseconds, and a series of separate, parallel circuit paths corresponding in number to the thyristors in said inverter circuit for delivering said pulse signals to the respective thyristors, each circuit path including a pulse transformer having an input winding coupled to said digital sequencer means and an output winding coupled to said thyristor, said transformer having a response characteristic selected to retain the substantially rectangular shape of the individual pulses, and amplification means in circuit with said pulse transformer for increasing the amplitude of the pulses passing to the respective thyristors.

* * * * *